UNITED STATES PATENT OFFICE.

WALTHER MATHESIUS, OF CHARLOTTENBURG, GERMANY.

PROCESS FOR THE REDUCTION OF METALLIC OXIDS.

1,003,627.     Specification of Letters Patent.     Patented Sept. 19, 1911.

No Drawing.     Application filed March 16, 1910. Serial No. 549,578.

*To all whom it may concern:*

Be it known that I, WALTHER MATHESIUS, a subject of the King of Prussia, and resident of 10 Carmerstrasse, Charlottenburg, near Berlin, in the German Empire, have invented a new and useful Process for the Reduction of Metallic Oxids, of which the following is a specification.

This invention relates to a process for the reduction of metallic oxids.

In the oxidation of iron to oxids of iron, of carbon to carbonic oxid, and carbonic acid it is well known that heat is evolved and the amount of heat has been well established by exact experiments. The heat of formation of oxids as determined by the applicant and as recorded in current literature of to-day is approximately as follows: $FeO$ —75600 calories, $Fe_3O_4$ —277200 calories, $Fe_2O_3$ —201600 calories, $CO$ —29640 calories, $CO_2$ —96960 calories, $CO.O$ —67200 calories.

From the foregoing figures the values given in the following Table I have been deduced, which relate to 1 kg. of the material to be oxidized.

TABLE I.

*Units of heat evolved by burning of 1 kg. of material with the necessary amount of oxygen:*

| | Heat Units. |
|---|---|
| Fe to FeO | 1350 |
| Fe to $Fe_3O_4$ | 1650 |
| Fe to $Fe_2O_3$ | 1800 |
| C to CO | 2470 |
| C to $CO_2$ | 8080 |
| CO to $CO_2$ | 2400 |

These values with respect to the amount of energy set free by the reaction cannot be directly compared because the standards by which they are measured, the kg. of iron and the kg. of coal, are not directly comparable. A perfectly clear estimate of these units of energy can be obtained by reducing them to a like standard of 1 kg. of oxygen which figures in all reactions to be here taken into account as with iron or carbon or carbonic oxid.

The units of heat, corresponding to the units of reacting substances, which are then evolved, are set forth in the following Table II. The figures have been obtained by simple rule of three from the figures given in Table I.

TABLE II.

*Units of heat which are evolved by the reaction of 1 kg. of oxygen with the necessary quantity of the substance:*

| | Heat Units. |
|---|---|
| Fe to FeO | 4725 |
| Fe to $Fe_3O_4$ | 4331 |
| Fe to $Fe_2O_3$ | 4200 |
| C to CO | 1852.5 |
| C to $CO_2$ | 3080 |
| CO to $CO_2$ | 4200 |

From this follows:

| | Heat Units. |
|---|---|
| FeO to $Fe_3O_4$ | 3149 |
| $Fe_3O_4$ to $Fe_2O_3$ | 3152 |
| Average heat units: 3150. | |

Since in the reduction of a substance, for instance of ferric oxid to metallic iron, the same units of heat are expended as are recovered by the oxidation of iron to ferric oxid, the figures in the following Table III afford a perfectly clear statement of the transmission of heat set up when the different oxids of iron are reduced by carbon or by carbonic oxid, assuming that the carbon used is transformed into carbonic oxid and the carbonic oxid into carbonic acid. The figures given in Table III have been obtained by simple addition and subtraction and correspond to each kilogram of reacting oxygen.

TABLE III.

*Transmission of heat on the reduction of oxids of iron by C or CO calculated on the basis of 1 kg. of reacting oxygen:*

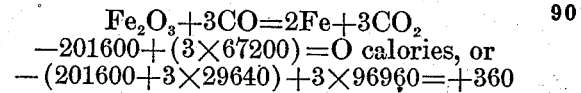

| | By C: | By CO: |
|---|---|---|
| FeO to Fe | —2872.5 units of heat | —525 units of heat |
| $Fe_3O_4$ to Fe | —2478.5 " | —131 " |
| $Fe_2O_3$ to Fe | —2347.5 " | +0 " |
| $Fe_2O_3$ & $Fe_3O_4$ to FeO | —1297.5 units of heat | +1050 " |

The heat evolved in the reaction of ferric oxid with carbon monoxid may also be determined from the heats of formation of the oxids hereinbefore given, as follows:—

$$Fe_2O_3 + 3CO = 2Fe + 3CO_2$$
$$-201600 + (3 \times 67200) = 0 \text{ calories, or}$$
$$-(201600 + 3 \times 29640) + 3 \times 96960 = +360$$

calories—that is to say, from 0 to 360 kilogram calories of heat are evolved on treating 160 kilograms of pure ferric oxid.

It is of course to be understood that the figures here given are not held to be strictly correct and it may be remarked that Jüptner in his "*Grundzüge der Siderologie*"

volume 3, year 1904 page 27 gives the following figures:

$$Fe_2O_3 + 3CO = Fe_2 + 3CO_2$$
$$-1800 \qquad\qquad +1801 \text{ calories}$$

or an evolution of 1 kilogram calorie of heat for every 160 kilograms of pure ferric oxid.

From this it will be seen that, in the reduction of oxid of iron to iron by carbonic oxid there is practically neither evolution nor absorption of heat—a very important fact to which hitherto at least no attention has been paid. From this result the deduction can be made that ferric oxid can be reduced to iron by carbonic oxid without practically any change of temperature taking place in the reacting bodies assuming naturally that the necessary reaction temperature is obtained and given also the other conditions for the process of reaction. This knowledge is of the greatest importance since firstly the most favorable reaction temperature for the process of the aforesaid reaction is about 700–800° C. and since generally natural ores at least do not conglomerate at this temperature.

It is known that oxids of iron when once conglomerated or slagged cannot be reduced by gases and this fact can be easily explained by the circumstance that owing to the slag the oxids of iron are no longer accessible to the gases. Slagged oxids of iron can therefore, as for example in the blast furnace, only reach reaction with carbon when fused and then in in this state react with the carbon, which is also fused, in the slag. On the other hand as found by experience all oxids of iron without slag can be reduced by gases.

The opinion has commonly been held in the art that the effect of the reducing gases upon ferric oxid has been to produce a stepwise action of the oxygen so that firstly the ferric oxid was changed to ferroso-ferric oxid, then this into ferrous oxid and finally this into metallic iron. Applicant has found after many years experimental study that this opinion is not always correct but that, given the proper conditions of reaction, that is to say, a suitably high temperature and a proper proportion of carbonic oxid and carbonic acid in the mass, the reduction of the ferric oxid by carbon oxid proceeds at once from ferric oxid to metallic iron. The result of this observation is of decisive significance with respect to the possibility of the reduction on a large scale of ferric oxid to metal by gases without entailing a smelting operation.

If the reaction $Fe_2O_3 + 3CO = 2Fe + 3CO_2$ required heat, then to attain the reaction, it would certainly be necessary to insure the passage of great heat throughout the mass. For this purpose there would appear to be no other means than the blast furnace process. If the reaction is exothermic then during its course such a rise in temperature would take place that conglomeration would unavoidably take place, whereby any further influence of the gases upon the ferric oxid would be prevented.

If the giving off of oxygen from the ferric oxid were to take place in the above mentioned stages the reaction would then, according to the figures given in Table III be to a very great degree exothermic and the danger of conglomerations taking place would again be present and finally upon the conversion of ferrous oxid into metallic iron the reaction would become decidedly endothermic.

It is only the fact, hitherto disregarded, that the reaction indicated by the above equation, is practically neither exothermic nor endothermic, which renders possible the execution of a rational process of conversion of the oxids of iron present in the ores into metallic iron without necessitating the extension of the process to fusing point as in the blast furnace process.

The process according to the present invention is carried out in the following manner:—In a blast furnace the ores to be reduced fall downward while the reducing gases flow upward to meet them. Both the ores and the gases before they enter the blast furnace must be previously heated to the reaction temperature which is generally about 700–900° C. When the ore is in a favorable condition and the pieces are not too large, contact between the gas and ore for a few hours will be sufficient for the conversion to metallic iron of all the oxids of iron contained in the mass under simultaneous proper carburization.

The previous heating of the ores conveniently takes place in separate furnaces for example in the well known rotary drum furnaces which are commonly used in the cement-industry, the heating of which can be conveniently effected by the gases from the reducing blast furnace. For the proper utilization of the heating gases it is desirable to provide an oxidizing flame, whereby the additional advantage is obtained that any ferrous oxid or any combinations thereof are converted into ferric oxid.

The reducing gases may be either generator gases, coke oven gases, natural gases from the earth, mineral oil gases or the like the only necessary condition being that these gases before they enter the reducing blast furnace must first be heated to about 900° since naturally these gases must introduce into the reducing furnace such an excess of heat as may be necessary to balance the unavoidable loss by radiation. The previous heating of these gases can be easily effected for example in the well known Cowper-apparatus which can itself be heated by the gases from the reducing furnace.

The ore passing out of the bottom of the reducing furnace is first cooled by passage over iron surfaces cooled by water and finally cooled down by a gentle water spraying so that upon coming into contact with the atmosphere the temperature of the ore is not higher than about 150° C. As experience has shown the finely divided metallic iron will not then undergo any oxidation and the material can then without any further measures of precaution be subjected to either a dry, a wet or a magnetic separating process.

The process can in a like manner be utilized for the separation of other metals such as nickel, cobalt, copper and tin for example.

I claim:—

1. A process for the reduction of metal from metallic oxid ores by means of reducing gases containing carbon monoxid, which consists in preheating the ore and reducing gases so as to bring them together in the reducing chamber at a temperature which will not cause the slag constituents to agglomerate, the relative proportion of carbon dioxid, generated in the reducing chamber, to carbon monoxid in the reducing gases, being so maintained that the ore is directly reduced to the metal.

2. A process for the reduction of metal from metallic oxid ores by means of reducing gases containing carbon monoxid, which consists in preheating the ore and reducing gases so as to bring them together in the reducing chamber at a temperature which will not cause the slag constituents to agglomerate, the relative proportion of carbon dioxid, generated in the reducing chamber, to carbon monoxid in the reducing gases, being so maintained that the ore is directly reduced to the metal and in cooling the product out of contact with air.

3. A process for the reduction of metal from metallic oxid ores by means of reducing gases containing carbon monoxid, which consists in subjecting the ore to oxidation and preheating the ore and reducing gases so as to bring them together in the reducing chamber at a temperature which will not cause the slag constituents to agglomerate, the relative proportion of carbon dioxid, generated in the reducing chamber, to carbon monoxid in the reducing gases, being so maintained that the ore is directly reduced to the metal.

4. A process for the reduction of metal from metallic oxid ores by means of reducing gases containing carbon monoxid, which consists in subjecting the ore to oxidation and preheating the ore and reducing gases so as to bring them together in the reducing chamber at a temperature which will not cause the slag constituents to agglomerate, the relative proportion of carbon dioxid, generated in the reducing chamber, to carbon monoxid in the reducing gases, being so maintained that the ore is directly reduced to the metal and in cooling the product out of contact with air.

5. A process for the reduction of metal from metallic oxid ores by means of reducing gases containing carbon monoxid, which consists in subjecting the ore to oxidation, preheating the ore and reducing gases and bringing the ore and gases together in the reducing chamber at a temperature which will not cause the slag constituents to agglomerate, the relative proportion of carbon dioxid, generated in the reducing chamber, to carbon monoxid in the reducing gases, being so maintained that the ore is directly reduced to the metal, the ore as it descends in the reducing chamber being subjected to the upward flow of the gases.

6. A process for the reduction of metal from metallic oxid ores by means of reducing gases containing carbon monoxid, which consists in subjecting the ore to oxidation, preheating the ore and reducing gases and bringing the ore and gases together in the reducing chamber at a temperature which will not cause the slag constituents to agglomerate, the relative proportion of carbon dioxid, generated in the reducing chamber, to carbon monoxid in the reducing gases, being so maintained that the ore is directly reduced to the metal, the ore as it descends in the reducing chamber being subjected to the upward flow of the gases, and thereafter cooling the product out of contact with air.

7. A process for the reduction of iron from iron ore by means of reducing gases containing carbon monoxid, which consists in preheating the ore and reducing gases so as to bring them together in the reducing chamber at a temperature of between 700 to 900° C which will not cause the slag constituents to agglomerate, the relative proportion of carbon dioxid, generated in the reducing furnace, to carbon monoxid in the reducing gases being so maintained that the ore is directly reduced to the metal.

In witness whereof I have hereunto set my hand in the presence of two witnesses.

WALTHER MATHESIUS.

Witnesses:
  Henry Hasper,
  Woldemar Haupt.